United States Patent [19]

Oetiker

[11] Patent Number: 4,832,380
[45] Date of Patent: * May 23, 1989

[54] PIPE CONNECTION AND CLAMP FOR SAME

[76] Inventor: Hans Oetiker, Oberdorfstrasse 21, CH-8810 Horgen, Switzerland

[*] Notice: The portion of the term of this patent subsequent to Sep. 15, 2004 has been disclaimed.

[21] Appl. No.: 254,065

[22] Filed: Apr. 14, 1981

Related U.S. Application Data

[63] Continuation-in-part of Ser. No. 815,371, Jul. 13, 1977, which is a continuation-in-part of Ser. No. 531,793, Dec. 11, 1974, which is a continuation-in-part of Ser. No. 387,446, Aug. 10, 1973.

[30] Foreign Application Priority Data

Aug. 10, 1972 [CH] Switzerland ............... 11836/72

[51] Int. Cl.$^4$ ................................ F16L 25/00
[52] U.S. Cl. ................. 285/328; 285/334.5; 285/39; 285/365; 285/371; 285/382; 285/906; 285/915
[58] Field of Search .............. 285/332.3, 334.5, 367, 285/371, 372, 365, 366, 328, 364, 365, 366, 382, 406–411, 112, 906, 915; 24/20 CW, 279

[56] References Cited

U.S. PATENT DOCUMENTS

| 755,994 | 3/1904 | Broome | 285/367 X |
|---|---|---|---|
| 1,825,062 | 9/1931 | Reaton et al. | 285/365 |
| 2,214,381 | 9/1940 | Rastetter | 403/338 |
| 2,473,102 | 6/1949 | Krooss | 285/112 |
| 2,614,304 | 10/1952 | Oetiker | 24/20 CW |
| 2,635,900 | 4/1953 | Mayo et al. | 285/334.2 |
| 2,663,582 | 12/1953 | Sebok | 285/334.5 |
| 3,024,046 | 3/1962 | Frost et al. | 285/112 |
| 3,087,221 | 4/1963 | Armstrong | 24/20 CW |
| 3,402,436 | 9/1968 | Oetiker | 24/20 CW |
| 3,494,667 | 3/1970 | Pfeuffer | 285/365 X |

FOREIGN PATENT DOCUMENTS

| 813192 | 2/1937 | France | 285/365 |
|---|---|---|---|
| 844174 | 7/1939 | France | 285/328 |
| 218292 | 1/1968 | Sweden | |
| 719577 | 12/1954 | United Kingdom | 285/365 |
| 977205 | 12/1964 | United Kingdom | |
| 1065634 | 4/1967 | United Kingdom | |

Primary Examiner—Dave W. Arola
Attorney, Agent, or Firm—Paul M. Craig, Jr.

[57] ABSTRACT

A pipe connection in which pipe ends are provided with flared ends within the area of the joint edges, and in which a clamping ring with a U-shaped internal profile in a cross section is adapted to be tightened radially inwardly; the inner end faces of the clamping ring and the flared end faces are inclined toward the pipe axis so that the joining edges are urged toward one another in the tightened condition of the clamping ring; the clamping ring is provided with at least one plastically deformable, lug-shaped ear adapted to be tightened by contraction thereof to thereby establish a permanent connection which can be reopened only by destruction of the clamping ring; the surfaces of the clamping ring which engage with the end faces of the flarings may be further provided with means, e.g., in the form of notches, teeth, serrations or embossments to prevent rotation of the ring relative to the joint edges.

38 Claims, 2 Drawing Sheets

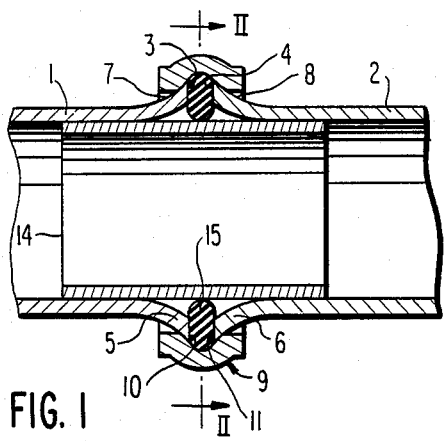
FIG. 1
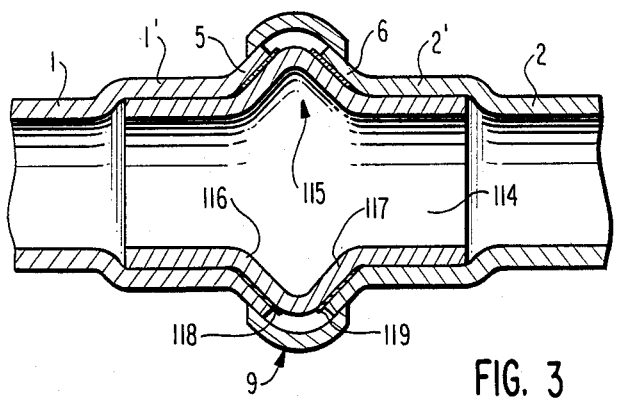
FIG. 3
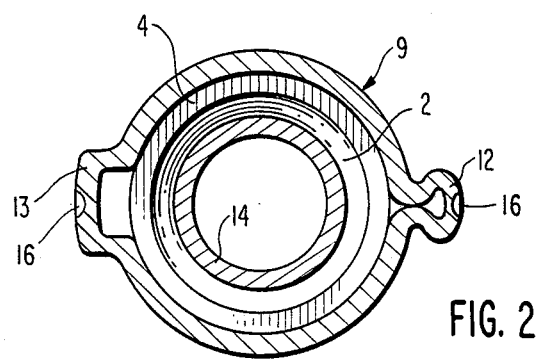
FIG. 2
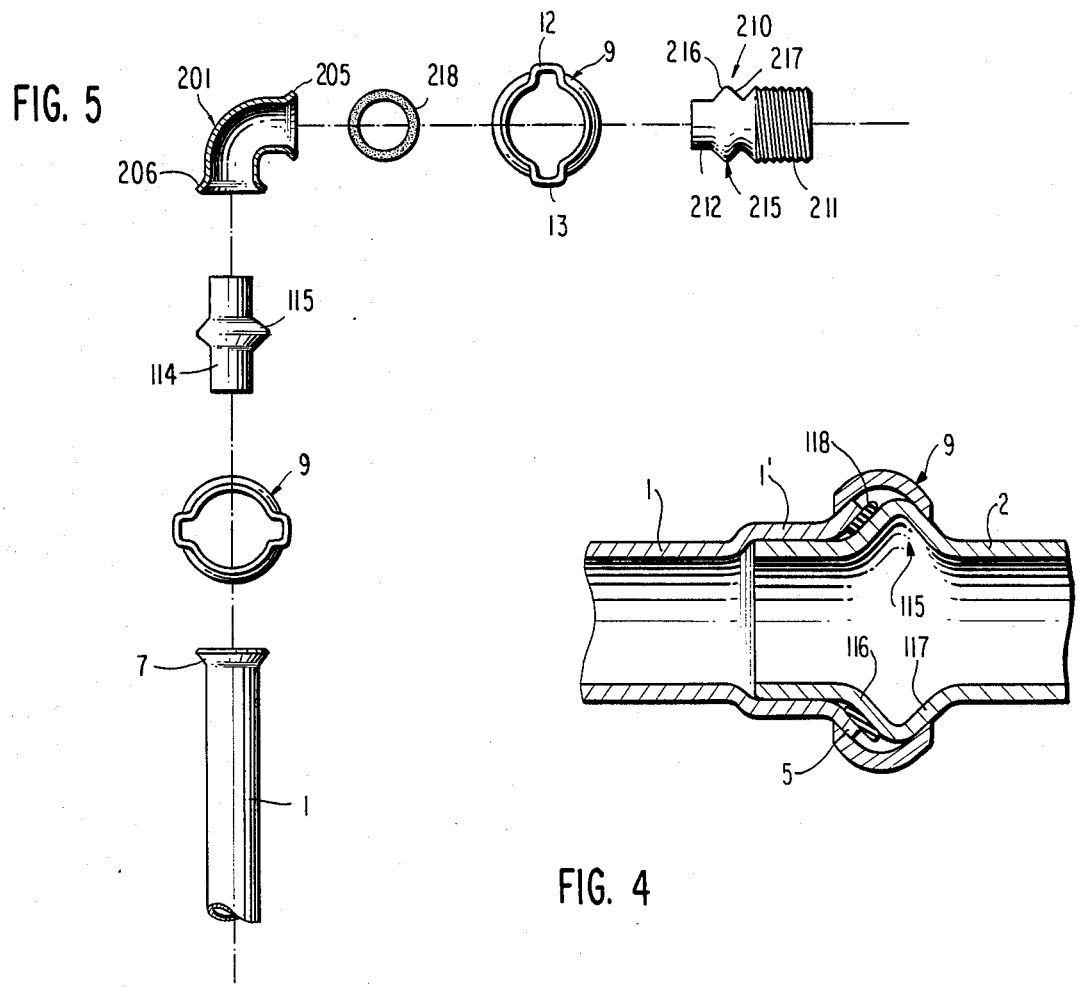
FIG. 5
FIG. 4

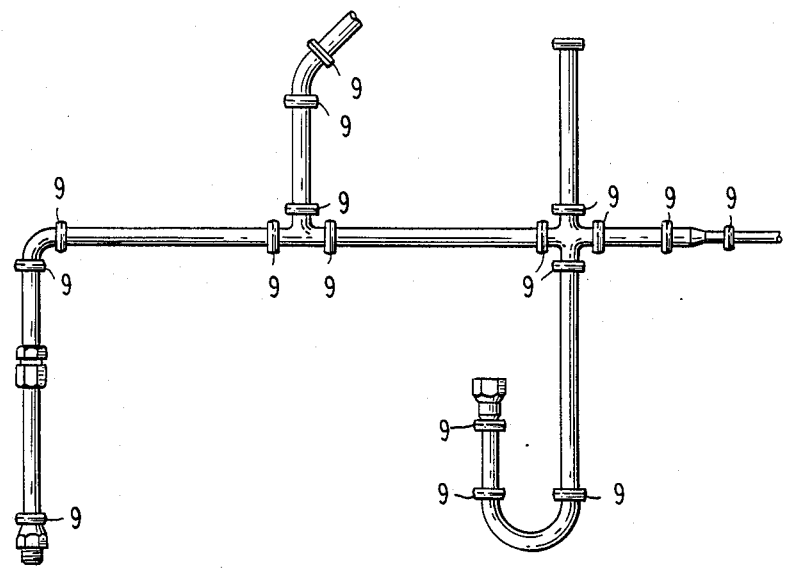
FIG. 6
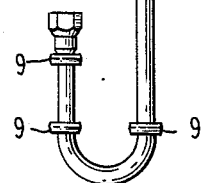
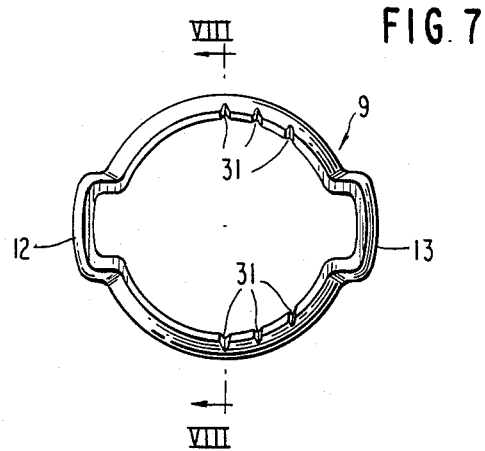
FIG. 7
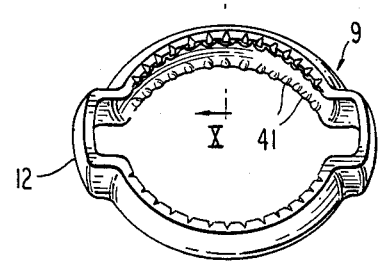
FIG. 9
FIG. 10
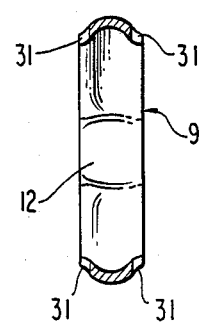
FIG. 8
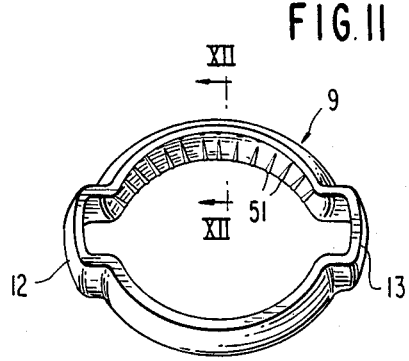
FIG. 11
FIG. 12

PIPE CONNECTION AND CLAMP FOR SAME

The present application is a continuation-in-part application of the copending application Ser. No. 815,371, filed in the U.S. Patent and Trademark Office on July 13, 1977, as a continuation-in-part application of Ser. No. 531,793, filed in the U.S. Patent and Trademark Office on Dec. 11, 1974 as a continuation-in-part application of the then copending application Ser. No. 387,446, filed in the U.S. Patent and Trademark Office on Aug 10, 1973, and claiming the right of priority of the Swiss Application No. 11836/72 of Aug. 10, 1972, the right of priority of which is also claimed herein.

The present invention relates to a pipe or tube connection in which pipe or tube ends are provided with lips or flarings, especially with axially symmetrical lips or flarings in the joining area and which comprises a clamping ring having a U-shaped profile at the internal surface in a cross section parallel to and containing the ring axis, whereby the internal faces of the clamping ring and the end faces of the lips or flarings facing away from the joint, are inclined toward the pipe axis so that, in the tightened condition of the clamping ring, the joining edges of the pipe or tube ends are urged and pressed toward each other.

Various pipe connections with clamping collars or clamping rings are known in the prior art, in which flared ends are held together by various locking and/or tightening devices. For example, in one such prior art type of construction exemplified by Swiss Pat. No. 42,094; British Pat. No. 543,529; and U.S. Pat. No. 2,941,823, individual segments of the clamping collar are locked together by threaded means, for example, by tangential bolts. Such constructions are not only expensive to manufacture and assure fluid-tightness only for the conditions under which the threaded means had been tightened, but also involve either expensive wing nuts requiring much space for the tightening operation or a special-purpose tool. Another type of construction is known in the prior art which is not equipped with a screw-type closure mechanism, but instead utilizes a toggle-type securing mechanism, as exemplified by French Pats. Nos. 813,192 and 1,016,629; 2,649,632 and British Pats. Nos. 946,187 and 977,205. Furthermore, still further types of construction are known in the prior art, in which the clamping band is drawn together by non-threaded securing means devoid of any toggle-type device, as exemplified by U.S. Pats. Nos. 1,277,076 and 3,499,667 and Austrian Pat. No. 163,098.

All of these as well as other prior art pipe or tube couplings entail serious disadvantages. Apart from being complicated in structure, thereby involving relatively high manufacturing costs, they fail more importantly to provide a permanent, secure connection which is completely safe against temperature and pressure fluctuations as well as against unintentional subsequent reopening or release. The threaded connection by the use of a T-bolt as disclosed, for example, in U.S. Pat. No. 2,941,823 requires a relatively large number of complex parts, costly to manufacture, and like any threaded connection would require retightening, especially in case of a temperature increase causing thermal expansion to prevent the coupling from being completely released, for example, when a person inadvertently hits the T-bolt and displaces the latter together with the band. The same drawbacks are encountered with the type of couplings utilizing a toggle device which can be closed only for one circumferential length at a given temperature, i.e., for only one specific dimension, and is also likely to be opened up inadvertently, for example, by a person's clothing attempting to work within the frequently constricted areas where such clamps are to be used.

The present invention seeks to avoid the aforementioned disadvantages and to provide a very inexpensive pipe connection which can be permanently established by the use of a very simple tool and which also is able to withstand high pressures, temperature fluctuations as well as pressure fluctuations without the danger of developing undesired leaks.

Additionally, the present invention seeks to provide a pipe connection which is permanent in nature and cannot be inadvertently reopened, but instead requires a conscious, intentional destruction of a part thereof that otherwise remains firmly seated on and causes a permanent fluid-tight connection of the pipe parts. Moreover, the pipe coupling of the present invention is to be such that it can be used with parts that need not be manufactured to precise tolerances but is able to automatically compensate not only for manufacturing tolerances but also for thermal expansions and/or pressure increases or repeated pressure fluctuations in the parts of the pipe coupling without the danger of developing any leaks as a result thereof. These features are of the utmost importance where the pipe coupling is used to connect, for example, copper tubing sections in homes or buildings, carrying water or gas. Similarly, these features are also prerequisites in industrial applications utilizing stainless steel or similar pipes, such as for the connections in the exhaust gas systems of motor vehicles where long service life together with complete gas-tightness at relatively high operating temperatures and strong shocks and vibrations are absolutely necessary for the protection of the user of the motor vehicle.

For this purpose, a pipe or tube connection in accordance with the present invention is constructed in such a manner that at least the clamping ring, which is itself of approximately U-shaped cross section, is provided with at least one so-called "Oetiker" ear of substantially plastically deformable construction which, upon contraction, causes the tightening of the ring and establishes the permanent pipe or tube connection. The ear may thereby also be of approximately U-shaped cross section.

Clamping rings of flat band material and utilizing so-called "Oetiker" ears have been available since the early 1950's and have been used worldwide by the hundreds of millions as hose clamps, both in the form of closed rings (U.S. Pats. Nos. 2,614,304 and 3,082,498, FIGS. 1 and 2) or open rings (U.S. Pats. Nos. 2,847,742; 3,475,793; 4,222,155 and 4,237,485), which can be closed by hooks or barbs engaging in perforations, and which include one or several plastically deformable, lug-shaped ears that can be contracted with the use of simple tools, such as a pair of pincers.

The clamping rings of the pipe or tube coupling of the present invention, which are of different construction from these prior art hose clamps, not only permit their application and completely satisfactory installation with pipe or tubing parts of relatively widely differing external diametric dimensions, but also provide an automatic compensation for slight changes in the diametric dimensions of the parts once installed, which are caused, for example, by thermal expansions, and/or pressure fluctuations of the medium flowing through the connection, to thereby maintain a completely fluid-tight connection by the inherent operating characteristics of the "Oetiker" ears, which, due to the plastic deformation, seek to maintain the same tightening forces in the contracted condition of the ears.

One obtains with clamping rings, applied according to the present invention, a very inexpensive yet at the same time very dependable tubing connection which can be realized and established with the simplest possible tools.

In one embodiment of this invention, the clamping ring is preferably provided with a ring having a U-shaped profile over the entire internal surface thereof. This type of construction is unitary, i.e., in one-piece and is characterized by utmost inexpensiveness in manufacture and use thereof. Added thereto is the fact that a larger deformation effort is required for the contraction of the lug-shaped ear having a U-shaped profile over the entire internal surface than for an ear having a flat internal surface, whereby also the resistance of the material to expansion or reopening of the ear is correspondingly greater, whence this type of construction presses the joining edges of the pipe or tube ends together with extra strength and reliability.

According to another embodiment, a short section of a pipe piece which abuts flush against the inner surfaces of the pipe or tube ends and which axially overlaps the joint area may be provided on the inside of the pipe ends, whereby an annular seal arranged between the joining edges and surrounding the short piece of pipe is provided. A reliable axial alignment of the pipe ends is assured in this manner.

The ear may be provided with a generally circumferentially extending reinforcing groove so that the ear does not fold up when being contracted. This ensures a secure and reliable contracted condition of the clamping ring, capable of elastically absorbing also a diameter change of the pipe ends, as under temperature effects. The groove thereby presents an approximately elliptical or circular form extending the circumferential direction of the ring. This type of construction results in an especially stable apex of the ear.

If the inner diameter of the pipe is not to be reduced by the presence of the short pilot pipe section, according to another feature of the present invention, the ends of the tubes may be flared to provide a short section of enlarged diameter, in which a part of the short pipe section is received having the same inner diameter as the normal diameter of the pipes.

Moreover, in case of high temperature applications, high temperature seals in the form of flat gaskets of suitable high heat-resistant material such as asbestos may be used which are then inserted between the internal flared surfaces of the outer ends of the pipes and the outer surfaces of a bead having similarly shaped walls formed in the short pipe section.

In still another embodiment, one of the pipe ends itself may be provided with such a bead near its free end while the other pipe end is then suitably flared over a predetermined axial length to provide a short pipe section of enlarged diameter to receive therewithin the end of the one pipe of normal diameter whereby the other pipe end is additionally flared at the free end of its enlarged part to enable the formation of the pipe coupling by the use of a clamping ring in accordance with this invention cooperating with the bead.

The pipe coupling of the present invention can not only be used for coupling together two substantially axially aligned pipes, but can also be used to connect together pipe ends to produce various three-dimensional configurations. Particularly in case of the latter, it may be important to maintain the integrity of the three-dimensional configuration. Hence, according to still another feature of the present invention, the clamping rings of the present invention may be provided with means preventing with certainty relative rotary movements of the pipe ends about the pipe axes. These means may be in the form of notches, serrations or small teeth, or embossments provided along those internal surfaces of the U-shaped clamping ring that engage with the flared pipe ends. Clamping rings devoid of such anti-rotational means might, under certain circumstances, permit such relative rotation which is of no consequence when the pipe coupling is used to connect together two axially aligned pipes, since the fluid-tightness is not jeopardized even if such relative rotary movement takes place in the pipe coupling of the present invention.

Accordingly, it is an object of the present invention to provide a pipe or tubing connection which avoids by simple means the aforementioned shortcomings and drawbacks encountered in the prior art.

Another object of the present invention resides in a tubing connection which is relatively inexpensive in manufacture, obviates the need for tightening elements requiring a relatively large amount of space and eliminates the need for special tools.

A further object of the present invention resides in a tubing connection of the type described above which is able to withstand relatively high internal pressures, notwithstanding its simple construction.

Still a further object of the present invention resides in a pipe connection which can be readily established with the use of extremely simple tools.

Another object of the present invention resides in a simple pipe connection which assures a reliable and strong mutual abutment of the joining edges of the pipe ends, thereby assuring a fluid-tight connection of permanent nature, which reliably eliminates the danger of inadvertent reopening.

Still a further object of the present invention resides in a tubing connection which is simple in construction and inexpensive in manufacture, yet assures a reliable axial alignment of the pipe ends as well as an operationally reliable seal in the joint area.

A still further object of the present invention resides in a tubing connection of the type described above which is able to elastically absorb also diameter changes of the pipe ends caused, for example, by fluctuations in the temperature.

Still another object of the present invention resides in a clamping ring for a pipe coupling which not only permits a reliable fluid-tight connection between the pipe ends, but also is relatively inexpensive to manufacture and easy to install by the use of simple tools.

A further object of the present invention resides in a clamping ring for a pie coupling of the type described above, which achieves all of the aforementioned aims and objects in a most satisfactory manner, yet also prevents relative rotary movement between the pipe ends.

These and further objects, features and advantages of the present invention will become more apparent from the following description when taken in connection with the accompanying drawings which show, for purposes of illustration only, several embodiments in accordance with the present invention, and wherein:

FIG. 1 is an axial cross-sectional view through a pipe connection according to the present invention;

FIG. 2 is a cross-sectional view taken along line I—I of FIG. 1;

FIG. 3 is an axial cross-sectional view through another embodiment of a pipe connection in accordance with the present invention for applications under extreme temperatures with a beaded pipe insert section and with two flat high-heat-resistant seals, and in which the ends of the pipes are enlarged over predetermined axial lengths to receive within the enlarged portions a short pipe insert section with an inner diameter corresponding to the full normal inside diameter of the selected tubing;

FIG. 4 is a cross-sectional view through still another embodiment of a pipe connection in accordance with the present invention for high temperature applications, in which the shoft pipe insert section is obviated by providing a bead near one end of a pipe itself;

FIG. 5 is an exploded view illustrating a pipe connection system including a right-angle tube-connecting system in accordance with the present invention;

FIG. 6 is a somewhat schematic elevational view illustrating typical applications of a pipe-connecting system in accordance with the present invention to provide a three-dimensional pipe system;

FIG. 7 is an elevational view of a clamping ring in accordance with the present invention provided with anti-rotational notches;

FIG. 8 is a transverse cross-sectional view taken along line VIII—VIII of FIG. 7;

FIG. 9 is a perspective view of a modified embodiment of a clamping ring in accordance with the present invention provided with anti-rotational teeth;

FIG. 10 is a cross-sectional view taken along line X—X of FIG. 9;

FIG. 11 is a perspective view of a still further embodiment of a clamping ring in accordance with the present invention provided with anti-rotational embossments; and FIG. 12 is a cross-sectional view taken along line XIII—XIII of FIG. 11.

Referring now to the drawing wherein like reference numerals are used throughout the various views to designate corresponding parts, and more particularly to FIG. 1, this figure illustrates the pipe ends 1 and 2, which are provided with axially symmetrical lips or flarings 5 and 6 within the area of their joining edges 3 and 4. In the illustrated embodiment, the lips or flared ends 5 and 6 are constructed as trumpet-shaped enlargements of the pipe ends which are formed by flaring the pipe ends by conventional means. The surfaces 7 and 8 of the flared ends 5 and 6 are inclined with respect to the pipe axis. A clamping ring generally designated by reference numeral 9 having internal surfaces of approximately U-shaped profile (FIG. 1) is adapted to be tightened over the flared end 5 and 6 by reducing the clamping ring diameter radially inwardly. To that end, the internal flanks 10 and 11 are also inclined with respect to the pipe axis so that, in the tightened condition of the clamping ring 9, the joining edges 3 and 4 of the pipe ends 1 and 2 are urged toward each other. It would be sufficient as such, if only the surfaces 7 and 8 of the flared ends 5 and 6 or if only the internal faces 10 and 11 of the clamping ring 9 were inclined with respect to pipe axis; however, establishing the pipe connection is considerably facilitated if both mentioned faces are constructed so as to be inclined to the piped axis.

The clamping ring 9 is provided with two plastically deformable lug-shaped ears 12 and 13 (FIG. 2) of so-called "Oetiker" type which are capable of being contracted for the purpose of tightening the ring. In the illustrated embodiment, only the ear 12 is shown contracted, so that the clamping ring 9 is not yet fully tightened. Only after the ear 13 is also contracted, the clamping ring 9 will be completely tightened. For purposes of plastically deforming the ears 12 and 13, an ordinary pair of pincers may be used which is preferably substituted by pneumatic pincers in case of assembly-line production. It can be seen from FIG. 1 that the ring 9 has a convex external surface. For this reasons, the pair of pincers, by means of which the ring is tightened, is preferably provided with corresponding recesses in its jaws.

A short pipe insert section 14 is arranged on the inside of the pipe ends 1 and 2 which axially overlaps the joining edges 3 and 4 and rests snugly against the internal surfaces of the pipe ends. A annular seal 15 is arranged between the joining edges 3 and 4 which surrounds the central area of the ppe insert section 14.

The lug-shaped ears 12 and 13 are each provided within the area of their apices with an indentation or groove 16 having an elliptical or circular form extending in the direction of the circumference of the ring which serves to stiffen and reinforce the apex portion of the ears 12 and 13 to increase the holding ability of the pipe coupling.

The insertion of the short pipe insert section 14 is not absolutely necessary, depending on the prevailing conditions. Furthermore, in certain applications the seal 15 can be omitted and a sufficient sealing action is obtained, with a pipe insert section 14 by the use of a conventional self-drying sealer, such as "Loktite" which is then smeared about the ends of the pipe insert 14 and will provide a seal once the pipe sections 1 and 2 are emplaced and the sealer has dried. Additionally, even a commercial paint can be used in some cases in lieu of a sealer.

FIG. 3 illustrates an embodiment of a pipe connection according to the present invention which can be used for special applications under extreme heat or temperature. This embodiment differs from FIGS. 1 and 2 in that the short pipe insert section 114 includes a more or less centrally arranged bead generally designated by reference numeral 115 which is defined by inclined wall portions 116 and 117 formed by conventional means in the tube section 114. The wall portions 116 and 117 are thereby inclined to the tubing axis at an angle substantially similar to the angle of inclination of the flared ends 5 and 6. Flat gasket-like seals 118 and 119 made of high heat-resistant material such as asbestos are placed between the external surfaces of wall portions 116 and 117 and the internal surfaces of the flared ends 5 and 6. As to the rest, the arrangement of FIG. 3 is similar to that of FIG. 1, but provides a stronger mechanical connection than the construction of FIG. 1. Moreover, this arrangement can also be used for relatively high temperature applications without any seals. For lower temperature applications, either rubber or "Teflon" gaskets may also be used or "Teflon" tape may be wrapped around the bead 115. However, the gasket-like seals 118 and 119 may also be chosen fromany material suitable for a given application to be compatible with the gas or liquid to be carried by the pipe system, for example, to comply with FDA regulations.

As a further optional feature, the embodiment of FIG. 3 further differs from that of FIGS. 1 and 2 in that the pipes 1 and 2 are flared or enlarged over predetermined axial lengths to form widened portion 1' and 2', within which to receive the short pipe insert section 114 which has now the same internal diametric dimension as the normal inside diametric dimension of the pipes 1 and 2. Flow losses or restrictions are avoided in this manner in the pipe connection according to the present invention.

FIG. 4 differs from FIG. 3 in that the bead 115 with wall portions 116 and 117 is formed in the pipe or tubing 2 itself near the free end thereof. The flat gasket-like seal 118 is thereby accommodated between inclined wall portion 116 and flared lip 5 while the clamping ring 9 cooperates with the external surfaces of flared end 5 and of wall portion 117. This arrangement obviates the need for a separate short tubing insert 114 while the use of an enlarged portion 1' of pipe or tube 1 again eliminates flow restrictions in the pipe connection of the present invention.

The general arrangement of FIG. 4 may also be used in connection with a threaded adapter member generally designated by reference numeral 210 (FIG. 5) to enable a pipe connection in accordance with the present invention with a structural part (not shown) such a carburetor, provided with a bore having a female thread into which a threaded nipple is then screwed. For that purpose, the adapter member 210 of FIG. 5 includes an externally threaded section 211 on the side thereof, intended to be screwed into the structural part, and an unthreaded section 212 adapted to receive externally thereof the flared end 205 of a pressed angle fitting generally designated by reference numeral 201. The adapter member 210 further includes a bead-like projection generally designated by reference numeral 215 which is similar to the bead-like projection 115 of FIG. 3 and again has inclined wall portions 216 and 217. The clamping ring 9 thereby cooperates with the outer surface of the flared end 206 and with the outer wall surface 217 of the bead 215, the flared end 205 being drawn tightly against the inclined wall portion 216 under interposition of a flat seal 218 when the ears 12 and 13 of the clamping ring 9 are plastically deformed to contract the circumference of the ring 9. To facilitate insertion of the adapter member 210 into the structural part, the unthreaded section 212 thereof may be provided with a diametral slot (not shown) for the insertion of a tool, such as a socket wrench. While this connection entails significant savings in cost and weight as well as installation over prior art connections involving double-flared tubing ends, the connection can be further simplified if the adapter member can be brazed onto the structural part of formed integral therewith, for example, by casting. As to the rest of FIG. 5, the angular fitting 201 forms an elbow that subtends an angle of 90° and includes a further flared end 206 adapted to receive the short pipe section 114 provided with a bead 115. The flared end 206 is thereby adapted to be connected to the flared end 7 of the pipe section 1 by the use of the short pipe section 114 and by means of the clamping ring generally designated by reference numeral 9 possibly by the interposition of seals or flat gaskets (not shown) in the manner shown in FIG. 3. The pressed angle fitting 201 and its connection not only permit a considerable weight reduction over the prior art arrangements, but additionally improve the flow efficiency since the pressed angle fitting 201 offers reduced flow resistance.

FIG. 6 illustrates typical possibilities of a pipe system utilizing pipe connections in accordance with the present invention which, though shown in the two-dimensional plane of the drawing, may actually be of three-dimensional configuration. The various clamping rings used in this figure are again designated by reference numeral 9. It may be of interest, for example, with a three-dimensional configuration to prevent relative rotary motion of the pipe or tubing parts connected by the present invention. In actual practice, relative rotary motion about their axes, for example, of the pipe parts 1 and 2 of FIGS. 1, 3 and 4, may occur under certain circumstances, if a clamping ring of the type shown in FIGS. 1 and 2 is used. Such relative rotary motion is of little significance when, for example, the pipe sections to be connected are axially aligned since the fluid-tightness is not impaired thereby. However, in a three-dimensional system, the possibility of relative rotary motion may be undesirable. Hence, the present invention also provides clamping rings provided with means effectively preventing such relative rotary motion.

FIG. 7 illustrates one embodiment of a clamping ring generally designated by reference numeral 9 which is provided again with two "Oetiker" ears 12 and 13 and with anti-rotational meansin the form of notches 31 provided in the area of the radially inner edge portions of the U-shaped profile. These notches 31 may each extend in a generally radial direction and may be provided at suitable spacing over the entire circumference of the clamping ring 9 other than within the areas of the ears 12 and 13. However, they may also extend generally in the same direction, for example, in a direction approximately at right angle to the axial plane passing through the centers of the ears 12 and 13 and may only be provided over a portion of the circumference of the ring 9, as shown in FIG. 7.

FIGS. 9 and 10 illustrate a clamping ring 9 with a modified construction of the anti-rotational means in the form of small teeth or serrations 41, again formed in the area of the radially inner edge portions of the U-shaped profile and realized by corresponding material displacemetns of the clamping ring. The small teeth 41 may thereby extend over the entire circumference of the ring 9 other than within the area of the ears 12 and 13 or over only parts thereof sufficient to achieve the desired anti-rotational function.

In the embodiment according to FIGS. 11 and 12, the clamping ring 9 is provided with a still further modified anti-rotational meeans in the form of ridge-like embossments 51 which extend from the radially inner ends of the inclined surfaces of the U-shaped profile a predetermined distance toward the crown of the U-shaped profile.

The anti-rotational means of FIGS. 7-12 may be obtained by any conventional means, known as such in the prior art, for example, by the use of cutting, punching, pressing or stamping tools, rolling dies, etc.

The anti-rotational means of FIGS. 7-12 effectively prevent any relative rotary motion between flared pipe ends connected by the pipe coupling of the present invention without danger of damaging the flared pipe ends or otherwise impairing the fluid-tight connection. Moreover, the anti-rotational means in the clamping rings of the present invention do not lessen the holding ability of the clamping rings and do not significantly affect the strength of the material thereof necessary to assure reliable functioning even under the most adverse conditions.

From the foregoing, it is apparent that the clamping ring 9 in the various figures of the drawing is effective to tightly pull together the two parts 1, 2 or 201, 230 of a respective pipe coupling. The movement of these two parts toward each other is limited in effect in each of the embodiments, for example, in FIGS. 1, 2 and 3 by the edge faces of the flared ends with or without the interposition of a seal, in FIG. 4 by the edge face of flared end 205 and inclined wall portion 116, in FIG. 5 by the edge face of flared end 206 and inclined wall portion 236 of bead 235, etc.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A pipe connection in which pipe ends are provided with enlarged portions formed at least in part by inclined walls, characterized in that a clamping ring means extends circumferentially about the enlarged portions of the pipe ends which is operable to be tightened by contraction in the radially inward direction, in that said clamping ring means includes at least one plastically deformable ear means in its annular portion, and in that at least the annular portion has an approximately U-shaped internal cross-sectional profile in a transverse cross-sectional plane containing the axis of said clamping ring means to provide by the legs of the U-shaped profile, internal surfaces approximately complementary to and operable to engae with said inclined wall portions so that, in the contracted condition of the clamping ring means with the ear means plastically deformed, the pipe ends are securely urged toward each other by the resulting reduction in the diametric dimension of the ring means to thereby establish a permanent pipe connection safe against unintentional opening and capable of withstanding relatively high pressures and vibrations as well as temperature fluctuations without danger of inadvertent reopening or loosening of the connection which can be opened again only by conscious destruction of the clamping ring means or its ear means, said approximately U-shaped profile extending at least over the circumference of said annular portion, and in that the clamping ring means is provided with anti-rotational means in its surfaces operable to engage with the enlarged portions of the pipe ends at any relative circumferential position therebetween to prevent relative rotary motion between said pipe ends.

2. A pipe connection according to claim 1, characterized in that said anti-rotational means are in the form of notches within the area of the radially inner portions of the axial end faces of said approximately U-shaped profile.

3. A pipe connection according to claim 1, characterized in that said anti-rotational means include small teeth within the area of the radially inner portions of the axial end faces of said approximately U-shaped profile.

4. A pipe connection according to claim 1, characterized in that said anti-rotational means include rib-like embossments along the radially inner end portions of the internal surfaces of said approximately U-shaped profile.

5. A pipe connection according to claim 1, 2, 3, or 4, characterized in that said anti-rotational means extend over the entire circumference of the annular portion of the ring means.

6. A pipe connection according to claim 5, characterized in that said anti-rotational means are provided near the free ends of both legs of the approximately U-shaped profile.

7. A pipe connection according to claim 1, 2, 3, or 4, characterized in that said anti-rotational means are provided only over a part of the circumference of the annular portion of the ring means.

8. A pipe connection according to claim 7, characterized in that said anti-rotational means are provided near the free ends of both legs of the approximately U-shaped profile.

9. A pipe connection according to claim 1, 2, 3, or 4, characterized in that a short tubular member is provided on the inside of the pipe ends which axially overlaps the area of the joint and abuts flush at the inner surfaces of the pipe ends.

10. A pipe connection according to claim 9, characterized in that an annular seal means is arranged between the pipe ends which surround the tubular member.

11. A pipe connection according to claim 1, 2, 3, or 4, characterized in that the clamping ring is of approximately U-shaped internal cross-sectional profile throughout its annular extent including the ear means.

12. A pipe connection according to claim 1, 2, 3 or 4, characterized in that said U-shaped profile extends with substantially the same cross section uninterruptedly over the entire circumference of the clamping ring means inclusive the ear means, and in that said ear means is in one piece with the annular portion of said clamping ring means to form an endless ring-like structure.

13. A pipe connection according to claim 1, 2, 3 or 4, characterized in that each ear means is provided with a reinforcing groove within the area of its apex extending in the circumferential direction of the clamping ring means.

14. A pipe connection according to claim 1, 2, 3 or 4, characterized in that at least two lug-shaped ear means are provided in the clamping ring means which is in one-piece.

15. A pipe connection between two parts of which one is a pipe provided at its end with an enlarged portion formed at least in part by an inclined wall while the other part includes means near one end providing an enlarged portion with an inclined wall which is inclined oppositely to the inclined wall of said one part, characterized in that a clamping ring means extends circumferentially about said enlarged portions which is operable to be tightened by contraction in the radially inward direction, in that said clamping ring means includes at least one plastically deformable ear means in its annular portion, in that at least the annular portion has an approximately U-shaped internal cross-sectional profile in a transverse cross-sectional plane containing the axis of said clamping ring means to provide by the legs of the U-shaped profile, internal surfaces approximately complementary to and operable to engage with said inclined wall portions so that, in the contracted condition of the clamping ring means, with the ear means plastically deformed, the two parts are urged toward each other by the resulting reduction in the diametric dimension of the ring means to thereby establish a permanent pipe connection safe against unintentional opening and capable of withstanding relatively high pressures and vibrations as well as temperature fluctuations without danger of inadvertent reopening or loosening of the connection which can be opened again only by conscious destruction of the clamping ring means or its ear means, said approximately U-shaped profile extending at least over the circumference of said annular portion, and a short pipe section internally bridging the connection and extending into the first-mentioned pipe, said short pipe section being formed by one of the two parts consisting of said second part and a separate short pipe insert, and in that the clamping ring means is provided with anti-rotational means in its surfaces operable to engage with the enlarged portions of the pipe ends at any relative circumferential position therebetween to prevent relative rotary motion between said pipe ends.

16. A connection according to claim 15, wherein said short pipe section is formed by a separate insert member and said other part is also a pipe with an inclined wall portion formed at its end.

17. A connection according to claim 16, characterized by a bead-like means formed in said insert member and defined by mutually inclined wall portions at least .approximately parallel to said first-mentioned inclined wall portions on said first and second part.

18. A connection according to claim 17, characterized by flat gasket-like seal means between each respective inner surface of the first-mentioned inclined wall portions and each corresponding outer surface of the inclined wall portions of said bead-like means.

19. A connection according to claim 17 or 18, characterized in that the pipes of said first and second part are flared to provide widened portions that are wider than the normal inner diameter of said pipe, said widened portions receiving therein said hosrt pipe section of said insert member which has an inner diameter dimension corresponding essentially to said normal inner diameter.

20. A connection according to claim 15, wherein said short pipe section is formed by said other part.

21. A connection according to claim 20, characterized in that said means near one end of said other part is a bead-like means formed in said short pipe section and is defined by mutually inclined wall portions, of which one is at least approximately parallel to the first-mentioned inclined wall portion of said one part and the other is oppositely inclined under an approximately equal angle with respect to the pipe axis.

22. A connection according to claim 21, characterized by substantially flat gasket-like seal means between said at least approximately parallel inclined wall portions.

23. A connection according to clai 20 or 21, characterized in that the pipe of said one part is flared to provide a widened portion that is wider than the normal internal diametric dimension of said pipe to receive therein the short pipe section of said other part having substantially said normal internal diametric dimension.

24. A connection according to claim 15, characterized in that said other part is an adapter member having a threaded portion near one end, and in that said short pipe section is formed by said adapter member which includes intermediate its ends a bead-like means which is defined by mutually inclined wall portions.

25. A pipe connection according to claim 15, characterized in that said anti-rotational means are in the form of notches within the area of the radially inner portions of the axial end faces of said approximately U-shaped profile.

26. A pipe connection according to claim 15, characterized in that said anti-rotational means include small teeth within the area of the radially inner portionsof the axial end faces of said approximately U-shaped profile.

27. A pipe connection according to claim 15, characterized in that said anti-rotational means include rib-like embossments along the radially inner end portions of the internal surfaces of said approximately U-shaped profile.

28. A pipe connection according to claim 15, characterized in that said anti-rotational means extend over the entire circumference of the annular portion of the ring means.

29. A pipe connection according to claim 15, characterized in that said anti-rotational means are provided only over a part of the circumference of the annular portion of the ring means.

30. A clamp structure for use in making a pipe connection between two tubular parts with enlarged end sections formed at least in part by inclined wall portions, said clamp structure comprising clamping ring means including an annular portion having an approximately U-shaped internal cross-sectional profile whose leg portions form inclined internal surfaces approximately complementary to and adapted to engage with the inclined wall portions, said annular portion being operable to be tightened by contraction in the radially inward direction, at least one plastically deformable, lug-shaped ear means in and integral with said annular portion, said ear means being capable of plastic deformation to thereby tighten the annular portion over said enlarged end sections by the resulting reduction in diametric dimension and therewith exert by engagement of said inclined internal surfaces with said inclined wall portions, clamping forces having generally axially and mutually oppositely directed components which urge the enlarged end sections of the tublar parts toward one another and thereby establish a permanent pipe connection safe against unintentional reopening except by conscious destruction of the annular portion or ear means, said approximately U-shaped internal profile extending over at least a major portion of the circumference of said ring-shaped clamp structure, and the annular portion of the clamping ring means being provided with anti-rotational means in its surfaces operable to engage with the enlarged end sections of the tubular parts at any relative circumferential position therebetween to prevent relative rotary motion between said tubular parts.

31. A clamp structure according to claim 30, characterized in that said anti-rotational means are in the form of notches within the radially inner area of the axial end faces of the approximately U-shaped profile.

32. A clamp structure according to claim 30, characterized in that said anti-rotational means include small teeth within the radially inner area of the axial end faces of said approximately U-shaped profile.

33. A clamp structure according to claim 30, characterized in that said anti-rotational meansinclude rib-like embossments along the radially inner end portions of the internal surfaces of said approximately U-shaped profile.

34. A pipe connection according to claim 30, 31, 32 or 33, characterized in that said anti-rotational means extend over the entire annular portion of the ring means.

35. A pipe connection according to claim 30, 31, 32 or 33, characterized in that said anti-rotational means are provided only over a part of the annular portion of the ring means.

36. A clamp structure according to claim 30, 31, 32 or 33, characterized in that said approximately U-shaped profile extends with substantially the same cross section uninterruptedly over the circumference of the entire clamping ring means.

37. A clamp structure according to clai 30, 31, 32 or 33, characterized in that said approximately U-shaped profile extends with the same cross section over the entire circumference of the clamping ring means including the ear means, and in that said ear means is in one piece with the annular portion of said clamping ring means to form an endless ring-like structure.

38. A clamp structure according to claim 30, 31, 32 or 33, characterized in that the clamping ring means including its ear means are made in one piece.

* * * * *